United States Patent [19]

Su

[11] 4,294,747

[45] Oct. 13, 1981

[54] SHAPEABLE THERMOPLASTIC RESIN COMPOSITION CONTAINING CYCLIC ACETAL

[75] Inventor: Tien-Kuei Su, Spartanburg, S.C.

[73] Assignee: Milliken Research Corporation, Spartanburg, S.C.

[21] Appl. No.: 178,753

[22] Filed: Aug. 18, 1980

Related U.S. Application Data

[63] Continuation-in-part of Ser. No. 78,315, Sep. 24, 1979, abandoned.

[51] Int. Cl.$^3$ .............................................. C08K 5/06
[52] U.S. Cl. ............................... 260/37 R; 260/37 N; 260/40 R; 525/1; 528/274; 528/317
[58] Field of Search .................... 525/1; 528/274, 317, 528/37 R; 260/37 N, 40 R

[56] References Cited

U.S. PATENT DOCUMENTS 3,767,729 10/1973 Murai et al. ............................ 525/1
4,016,118 4/1977 Hamada et al. ......................... 525/1

*Primary Examiner*—Harold D. Anderson
*Attorney, Agent, or Firm*—H. William Petry; Terry T. Moyer

[57] ABSTRACT

A shapeable thermoplastic resin composition is provided which comprises a thermoplastic, condensation polymer or polymer blend substantially free of olefinic unsaturation having an intrinsic viscosity of from about 0.1 to about 5 and from about 0.01 to 2 percent by weight of a cyclic acetal as a nucleating agent.

12 Claims, No Drawings

SHAPEABLE THERMOPLASTIC RESIN COMPOSITION CONTAINING CYCLIC ACETAL

This application is a continuation-in-part of my earlier filed pending application, Ser. No. 078,315, filed Sept. 24, 1979, now abandoned.

This invention relates to thermoplastic shapeable compositions and to an improved process for preparing shaped articles from thermoplastic resin compositions.

Shapeable thermoplastic resin compositions made from condensation polymers generally have excellent physical properties and in particular have outstanding thermal stability due to their generally high melting points and dimensional stability due to their low moisture absorption. These properties permit the use of thermoplastic resin compositions, such as those made from crystalline polyethylene teraphthalate, for high temperature mechanical applications requiring close tolerances; for example, for electrical applications and for load bearing gears.

While such compositions do have certain desirable properties such compositions, in particular those made from, for instance, polyethylene terephthalate, crystallize slowly from the melt, which has limited the use of such polymers for articles formed by injection molding equipment; further, shaped articles such as molded articles made from polyethylene terephthalate have internal stresses in part caused by non-uniform spherulite growth and longer crystallization times. This confers low ductility and low impact resistance to low or high molecular weight resin compositions.

The addition of nucleating agents to thermoplastic resin compositions generally reduces crystallization time by providing a large number of sites which initiate crystal formation. A suitable nucleating agent must promote rapid crystallization under conditions of rapid cooling from the melt, such as occurs in injection molding. Since crystallization is dependent upon polymer chain mobility, the molecular weight of the polymer is also a factor in crystallization, and higher molecular weight, long chain polymers will have a longer induction time than lower molecular weight polymers. Thus, a nucleating agent which is in the liquid phase and is hence readily dispersible in molten themoplastic resin compositions and which is highly effective at low concentrations to promote crystal formation in such resin compositions is highly desirable. Such nucleating agent should function to increase molding rates and to reduce internal stresses in the formed articles, thereby improving their physical characteristics such as, for instance, impact strength.

It is known that certain materials in combination with finely divided solid metals, metal oxides, or metal salts promote the crystallization of themoplastic resin compositions such as polyethylene terephthalate. For example, one commercial thermoplastic polyethylene terephthalate molding composition contains benzophenone and talc as nucleating agents. However, nucleating agents which contain non-melting solids present problems of incorporation into the molten polymer and are difficult to disperse uniformly in the polymer.

It, therefore, would be highly desirable to provide thermoplastic resin compositions substantially free of olefinic unsaturation made from condensation polymers such as polyethylene terephthalate which are suitable for making into a shaped article. It would also be highly desirable to provide nucleating agents for thermoplastic resin compositions which are readily dispersible and which have improved crystallization properties.

Accordingly, it has been found that a shapeable resin composition which consists essentially of a thermoplastic condensation polymer substantially free of olefinic unsaturation, such as polyethylene terephthalate, other polyesters and polyamides may be provided which contain a minor effective amount sufficient to improve crystallization properties, e.g., from about 0.01 to about 2 percent by weight, of a cyclic acetal as a nucleating agent, said cyclic acetal being at least one member selected from the polyhydric alcohol acetals of benezaldehyde or its nucleically substituted derivatives, said polyhydric alcohols having 5 to 7 hydroxyl groups. Such compositions exhibit generally improved crystallization properties and provide products having improved physical characteristics.

In the molecular structures of the cyclic acetal compounds defined above, the alcohol portion which is acetalized by unsubstituted or substituted benzaldehyde preferably is a sugar alcohol of the formula, $HOCH_2(CHOH)_nCH_2OH$, wherein n is 3 to 5, preferably 3 to 4, such as xylitol, sorbitol or mannitol. Preferable as the ring substituents for benzaldehyde are halogen, alkyl groups with one to eight carbon atoms and preferably with one to four carbon atoms, alkoxyl groups with one to eight carbon atoms and preferably with one to four carbon atoms.

As is clear from the foregoing, preferable cyclic acetals usable as a nucleating agent according to the present invention are sugar alcohol acetals of benzaldehyde which may be ring substituted, said sugar alcohol having the formula, $HOCH_2(CHOH)_nCH_2OH$, wherein n is 3 to 5, preferably 3 to 4. A number of examples are given below.

Dibenzylidene-xylitol (=xylitol acetal or benzaldehyde), dibenzylidene-sorbitol (=sorbitol acetal of benzaldehyde) and dibenzylidene-mannitol (=mannitol acetal of benzaldehyde), as well as their derivatives wherein the benzene nucleus in either one or both of two benzylidene moieties has been substituted with chlorine, bromine, an alkyl group (e.g. methyl, ethyl, propyl, isopropyl, n-butyl, isobutyl, sec-butyl, octyl, etc.) and/or an alkoxy group (e.g. methoxy, ethoxy, n-propoxy; isopropoxy, butoxy, octoxy, etc.)

One of these typical cyclic acetals has the following chemical structure:

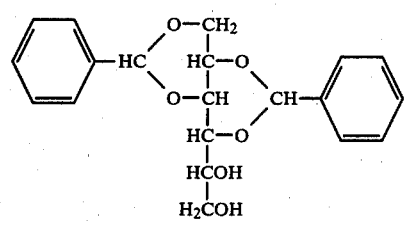

1,3;2,4-dibenzylidene-sorbitol (1,3;2,4 sorbitol acetal of benzaldehyde).

In the above-mentioned cyclic acetal compound, the alcohol portion thereof is sorbitol, and the aldehyde portion thereof is benzaldehyde.

The cyclic acetals of the present invention can be prepared in any method which per se is known for the preparation of acetals. Such method is described, for example, in Kirk-Othmer, "Encyclopedia of Chemical Technology," Vol. 1, pages 579 and 580.

Dibenzylidene sorbitol (DBS), the preferred nucleating agent for thermoplastic resin compositions according to the present invention, is known as a gelling agent for organic liquids (U.S. Pat. No. 3,880,794) and as a flocculating agent (U.S. Pat. No. 3,872,000) and as a modifier for polyolefin resins (U.S. Pat. No. 4,016,118). The compound may be prepared in a crude form, e.g., containing about 75 percent DBS and about 25 percent tribenzylidene sorbitol (TBS) by reacting d-sorbitol with a molar excess of benzaldehyde in water or certain organic liquids as a reaction medium in the presence of an acid catalyst at an elevated temperature to perform dehydrocondensation (U.S. Pat. No. 3,721,682). The crude DBS formed by this reaction may be further purified by mixing with a lower aliphatic alcohol to dissolve the impurities, separating and recovering the undissolved DBS (U.S. Pat. No. 4,131,612). According to the present invention, however, either crude or purified DBS may be used as a nucleating agent for thermoplastic resin compositions. For instance, it has been found that compositions containing about 75 percent DBS and about 25 percent TBS are very useful and frequently more convenient to use.

According to the present invention cyclic acetal nucleating agent may be added to the thermoplastic resin composition in amounts which are effective to nucleate the resin composition. Generally, the amount of cyclic acetal nucleating agent which may be added may be from about 0.01 to about 2 percent, preferably from about 0.1 to about 1 percent by weight of the thermoplastic resin. At least about 0.01 percent of nucleating agent will be required to significantly reduce crystallization induction times in the resin, whereas when more than about 2 percent is added little additional nucleating effect is noted. Large amounts, in excess of about 10 percent by weight, may have an adverse effect on the properties of the resin product.

The cyclic acetal nucleating agent of the present invention should be dispersed uniformly throughout the thermoplastic resin in order to obtain the benefits of the present invention. Molten thermoplastic resin and the nucleating agent may be simply mixed together until a good dispersion is obtained. Generally at temperatures at which the resin is molten the nucleating agent will melt and be incorporated uniformly into the resin as a liquid which is desirable.

While the compositions of the present invention are particularly suitable for shaping in injection molding equipment, they can also be extruded through a suitable die to form sheets, tubes, rods, fibers, films and the like and they can be cast to form film and sheet.

As mentioned, it has been found that cyclic acetals may be used to nucleate thermoplastic resin compositions made from condensation polymers as the predominate polymeric component. As used herein, the term "thermoplastic resin composition" is meant to include those thermoplastic resin compositions which are shapeable and which are made from condensation polymers. The condensation polymers furthermore are substantially free of olefinic unsaturation and are not to be confused with unsaturated polyester resins of the type disclosed by Murai et al. in U.S. Pat. No. 3,767,729. As disclosed by Murai, his unsaturated polyester resin compositions are prepared by dissolving an unsaturated polyester in a vinyl monomer. The unsaturated polyester is produced by a condensation reaction of polyhydric alcohols with $\alpha,\beta$-unsaturated polybasic acids or with a mixture of such acids and other polybasic acids. Thus, the Murai polyesters are unsaturated and may be thermoset by means of cross-linking. By contrast the thermoplastic resin compositions of the present invention contain substantially no olefinic unsaturation and thus they are thermoplastic resins. Such polymers of the present invention may include homopolymers of polyethylene terephthalate, copolymers of polyethylene terephthalate such as copolymers containing up to about 20 percent of a polyester prepared from an aromatic dicarboxylic acid other than terephthalic acid such as isophthalic acid, or from an alkylene glycol other than ethylene glycol such as propylene glycol. Such polymers further include blends of homopolymers and/or copolymers, such as blends of polyethylene terephthalate and polybutylene terephthalate. Other condensation polymers include, for instance, other polyesters, polyamides, polycarbonates and polyacetals, etc. Generally, thermoplastic resin compositions useful for making shaped articles have an intrinsic viscosity of from about 0.1 to 5, preferably 0.4 to 2, e.g., about 0.6 to about 1.6.

In addition to the dibenzylidene sorbitol nucleating agent, the thermoplastic resin composition of the present invention may also contain conventional fillers, pigments, mold release agents, reinforcing agents such as, for instance, fiber glass and the like. Even more importantly, the composition may further include a minor effective amount, e.g., from about 0.1 to about 10 percent by weight of a plasticizer, such as esters of dicarboxylic acids, e.g., phthalic, adipic, sebacic acids; esters, based on glycols such as ethylene glycol, butylene glycol and an appropriate carboxylic acid; tricresyl phosphate; and the like.

The shaped articles formed from the compositions of the present invention may be further treated, as by heating below the polymer melting point at from about 80°–150° C., which may further improve the physical properties of the shaped article such as impact resistance and ductility.

The invention may be further illustrated by reference to the following examples, although the invention is not to be limited to the details described therein. In the examples, all parts and percentages are by weight unless otherwise indicated.

In the examples, unless otherwise indicated, viscosity was determined from solutions of the resin composition in a mixture of equal parts by volume of sym-tetrachloroethane and phenol. Intrinsic viscosity data were obtained by extrapolation of the linear plot of the ratio of specific viscosity to concentration against concentration of the polymer in solution. Viscosities of the solvent and solutions were measured at 25° C. in a water bath using the Canon-Ubbelhode Dilution Viscometer.

EXAMPLE I

Commercially available polyethylene terephthalate resin pellets (A) having an intrinsic viscosity of 0.94 were ground into a fine powder, heated to about 100° C. in a glass jar. Then 0.5% by weight dibenzylidene sorbitol was added, and the powder was mixed thoroughly in a plant shaker. After mixing, the powder was dried thoroughly at 120° C. under vacuum conditions for about 24 hours. The mixture was then made into a thin film of from about 3 to 5 Mils ($10^{-3}$ in.) in thickness by compression molding under a nitrogen atmosphere at a temperature of between 280°–290° C.

EXAMPLE II

Example I was repeated except that the commercially available terephthalate resin, pellets B, used had an intrinsic viscosity of 0.60, as disclosed by the manufacturer.

EXAMPLE III

Example I was again repeated except that the resin employed was polybutylene terephthalate resin pellets (Eastman PBT 6 PRO).

EXAMPLE IV

Polyethylene terephthalate resin pellets C having an intrinsic viscosity of 0.71 were ground into a fine powder, heated to a temperature of about 100° C. in a glass jar and 0.5 percent by weight dibenzylidene sorbitol was added. The mixture was mixed thoroughly in a paint shaker and dried in a vacuum oven at 120° C. for about 24 hours.

EXAMPLE V

A sample of Rynite resin, a polyethylene terephthalate molding resin available from DuPont Corporation, was mixed with dibenzylidene sorbitol according to the procedure set forth in Example IV.

EXAMPLE VI

Commercially available Nylon 6 resin pellets were ground into a fine powder, heated to about 100° C. in a glass jar. Then, 0.5 percent by weight dibenzylidene sorbitol was added, and the powder was mixed thoroughly in a paint shaker. After mixing, the powder was dried thoroughly at 120° C. under vacuum conditions for about 24 hours. The mixture was then made into a thin film of from about 3 to 5 Mils ($10^{-3}$ in.) in thickness by compression molding under a nitrogen atmosphere at a temperature of between 250°-270° C.

TABLE

| Example Number | Polymer | Additive | Cooling Rate °C. Per Minute | Amount of DBS Added Percent By Weight | Ti (°C.) Temperature Crystallization Is Initiated | Tp (°C.) Crystallization Temperature | Te (°C.) Temperature Crystallization Is Complete | Ti Minus Te (°C.) |
|---|---|---|---|---|---|---|---|---|
| I | PET-A | None | 20 | 0 | 201.0 | 188.5 | 166.5 | 34.5 |
|   |       | DBS  | 20 | 0.5 | 208.0 | 196.0 | 181.5 | 26.5 |
| II | PET-B | None | 20 | 0 | 209.0 | 190.0 | 172.0 | 37.0 |
|   |       | DBS  | 20 | 0.5 | 214.5 | 205.5 | 195.5 | 19.0 |
| III | PBT | None | 20 | 0 | 184.0 | 173.0 | 168.0 | 16.0 |
|   |     | DBS  | 20 | 0.5 | 191.0 | 185.0 | 180.0 | 11.0 |
| IV | PET-C | None | 20 | 0 | 197.0 | 176.0 | 155.0 | 42.0 |
|   |       | DBS  | 20 | 0.5 | 204.0 | 188.0 | 169.0 | 35.0 |
| V | Rynite 530 | * | 40 | — | 206.5 | 199.0 | 189.0 | 17.5 |
|   |            | DBS | 40 | 0.5 | 211.5 | 205.5 | 197.5 | 14.0 |
| VI | Nylon 6 | None | 20 | 0 | 185.5 | 166.0 | 160.0 | 25.5 |
|   |          | DBS  | 20 | 0.5 | 186.0 | 181.5 | 178.0 | 8.0 |

*Other additives unknown

Thus, as the Table illustrates addition of dibenzylidene sorbitol to thermoplastic resin compositions promotes faster crystallization than was observed for the same thermoplastic resin compositions containing no dibenzylidene sorbitol. Furthermore, photomicrographs taken of the film products reveal that the spherulite crystals in the thermoplastic resin compositions used in the Examples wherein dibenzylidene sorbitol has been added to the composition generally are much more uniform and are about half the size of the crystals observed in the control samples of the resin without any dibenzylidene sorbitol nucleating agent having been added.

What is claimed is:

1. A shapeable resin composition which consists essentially of a thermoplastic, condensation polymer substantially free of olefinic unsaturation having an intrinsic viscosity of from about 0.1 to 5 measured at 25° C. in a mixture of equal parts by volume of sym-tetrachloroethane and phenol and an effective minor amount sufficient to improve crystallization properties of a cyclic acetal as a nucleating agent, said cyclic acetal being at least one member selected from the polyhydric alcohol acetals of benzaldehyde or derivatives thereof wherein the benzene ring of said benzaldehyde moiety is substituted with at least one substituent selected from the group consisting of halogen substituents, alkyl groups having one to eight carbon atoms, and alkoxy groups having one to eight carbon atoms, said polyhydric alcohols having 5 to 7 hydroxyl groups.

2. The resin composition of claim 1 wherein said thermoplastic, condensation polymer is a homopolymer of polyethylene terephthalate.

3. The resin composition of claim 1 wherein said shapeable resin composition further includes an effective minor amount of a thermoplastic resin plasticizer.

4. The resin composition of claim 1 wherein said thermoplastic, condensation polymer is a copolymer containing at least about 80 percent by weight polyethylene terephthalate.

5. The resin composition of claim 1 wherein said thermoplastic, condensation polymer is a polyamide made from the self-condensation of 6-amino-caproic acid or caprolactam.

6. The resin composition of claim 1 wherein said thermoplastic, condensation polymer is a polyester prepared from an aromatic dicarboxylic acid and an alkylene glycol.

7. The resin composition of claim 1 wherein said thermoplastic, condensation polymer is polybutylene terephthalate.

8. The resin composition of claim 1, wherein said resin composition further includes a filler.

9. The resin composition of claim 1 wherein said composition further includes a reinforcing agent.

10. The resin composition of claim 9, wherein said reinforcing agent is fiber glass.

11. An injection molding resin composition which comprises polyethylene terephthalate having an intrinsic viscosity of from about 0.4 to 1.5 measured at 25° C. in a mixture of equal parts by volume of sym-tetrachloroethane and phenol; from about 0.1 to 1 percent by weight of dibenzylidene sorbitol as a nucleating agent and from about 10 to 70 percent of a reinforcing agent.

12. The injection molding resin composition of claim 11 wherein said resin composition further includes an effective minor amount of a thermoplastic resin plasticizer.

* * * * *